United States Patent
Chang

(10) Patent No.: US 8,812,776 B2
(45) Date of Patent: Aug. 19, 2014

(54) DATA WRITING METHOD, AND MEMORY CONTROLLER AND MEMORY STORAGE DEVICE USING THE SAME

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 282 days.

(21) Appl. No.: 13/477,068

(22) Filed: May 22, 2012

(65) Prior Publication Data

US 2013/0262747 A1 Oct. 3, 2013

(30) Foreign Application Priority Data

Mar. 29, 2012 (TW) .............................. 101111124 A

(51) Int. Cl.
*G06F 12/02* (2006.01)
*G06F 12/16* (2006.01)

(52) U.S. Cl.
USPC ............................ 711/103; 711/165; 711/203

(58) Field of Classification Search
CPC ................ G06F 2212/7201; G06F 2212/7203; G06F 3/0662; G06F 3/0688; G06F 3/0689; G06F 11/1402; G06F 11/2094; G06F 3/0614; G06F 9/5077

USPC .......................................... 711/103, 165, 203
See application file for complete search history.

(56) References Cited

U.S. PATENT DOCUMENTS

| | | | |
|---|---|---|---|
| 8,086,585 B1 * | 12/2011 | Brashers et al. | 707/705 |
| 2006/0259687 A1 * | 11/2006 | Thomas et al. | 711/114 |
| 2013/0166839 A1 * | 6/2013 | Burton et al. | 711/114 |
| 2013/0191601 A1 * | 7/2013 | Peterson et al. | 711/137 |
| 2013/0290688 A1 * | 10/2013 | Bratanov | 712/228 |

* cited by examiner

*Primary Examiner* — John Lane
(74) *Attorney, Agent, or Firm* — Jianq Chyun IP Office

(57) ABSTRACT

A data writing method for a rewritable non-volatile memory module containing physical blocks is provided. The method includes: configuring virtual block address to map to at least a part of the logical blocks; receiving a write command which instructs to write file data to the first virtual block addresses, and the first virtual block addresses are mapped to first logical blocks of the at least the part of the logical blocks. The method further includes: writing the file data into the physical blocks mapped to a plurality of second logical blocks; determining whether a program failure is occurred during the writing period; and if the program failure is not occurred, the first virtual block addresses are remapped to the second logical block. Accordingly, the method can ensure the update completeness of the file data.

25 Claims, 11 Drawing Sheets

DATA WRITING METHOD, AND MEMORY CONTROLLER AND MEMORY STORAGE DEVICE USING THE SAME

CROSS-REFERENCE TO RELATED APPLICATION

This application claims the priority benefit of Taiwan application serial no. 101111124, filed on Mar. 29, 2012. The entirety of the above-mentioned patent application is hereby incorporated by reference herein and made a part of this specification.

BACKGROUND

1. Technical Field

The present invention generally relates to a data writing method, in particular, to a data writing method for a rewritable non-volatile memory module, a memory controller and a memory storage device using the method.

2. Description of Related Art

Along with the widespread of digital cameras, cell phones, and MP3 in recently years, the consumer' demand to storage media has increased drastically. Rewritable non-volatile memory module (e.g. flash memory) is one of the most adaptable storage media to portable electronic products (e.g. digital cameras mentioned above) due to its many characteristics such as data non-volatility, low power consumption, small volume, non-mechanical structure, and fast access speed.

In general, the rewritable non-volatile memory module includes a plurality of physical blocks which part of the physical blocks is configured to map to a plurality of logical blocks. When a host system wants to access the rewritable non-volatile memory module, the host system would transmit a command which is used to access the logical blocks to the memory controller which controls the rewritable non-volatile memory module. In the conventional technology, a physical block is considered as a basic unit when the rewritable non-volatile memory module is managed by the memory controller. When a file data is stored and scattered into a plurality of logical blocks and a program failure occurs while the execution of the write command, an issue of the update completeness of file data will arise. In detail, the logical blocks where the write command is completed will be mapped to the physical blocks that are stored with new data. However, the logical blocks where the program fail is occurred will still be mapped to the physical blocks which contain old data. Therefore, the stored file data in the logical blocks will be incomplete (only parts of data are updated and other parts are not). Hence, the issue of how to ensure the update completeness of data stored in a plurality of logical blocks is the concern for those skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the invention is directed to a data writing method for the memory controller and memory storage devices, which ensure the update completeness of file data which are stored and scattered in a plurality of logical blocks.

According to an embodiment of the present invention, a data writing method for a rewritable non-volatile memory module is provided. The rewritable non-volatile memory module comprises a plurality of physical blocks, wherein a plurality of logical blocks are configured to map to a part of the physical blocks. This data writing method comprises: configuring a plurality of virtual block addresses to map to a part of the logical blocks, and providing the virtual block addresses to a host system; receiving a write command from the host system, wherein the write command instructs writing a file data to a plurality of first virtual block addresses of the virtual block addresses. These first virtual block addresses are mapped to first logical blocks of the part of the logical blocks. The data writing method also comprises: writing the file data into the physical blocks mapped to a plurality of second logical blocks of the logical blocks; determining whether a program failure is occurred when the file data is written to the physical blocks mapped to the second logical blocks; and mapping the first virtual block addresses to the second logical blocks when the program failure is not occurred.

From another point of view, a memory storage device is provided according to an embodiment of the present invention. The memory storage device comprises a connector, a rewritable non-volatile memory module, and a memory controller. The connector is configured to couple to a host system. The rewritable non-volatile memory module includes a plurality of physical blocks, where a plurality of logical blocks are configured to map to a part of the physical blocks. The memory controller couples to the connector and the rewritable non-volatile memory module; configures a plurality of virtual block addresses to map to a part of the logical blocks; and provides the virtual block addresses to the host system. Furthermore, the memory controller receives a write command from the host system, wherein the write command instructs writing a file data to a plurality of first virtual block addresses of the virtual block addresses. The first virtual block addresses are mapped to a plurality of first logical blocks of the part of the logical blocks. The memory controller writes the file data to the physical blocks mapped to a plurality of second logical blocks of the logical blocks. The memory controller also determines whether a program failure is occurred when the file data is written to the physical blocks mapped to the second logical blocks. When the program failure is not occurred, the memory controller maps the first virtual block addresses to the second logical blocks.

From another point of view, a memory controller is provided according to an embodiment of the present invention. The memory controller comprises a host interface, memory interface, and a memory management circuit. The host interface is configured to couple to a host system. The memory interface is coupled to a rewritable non-volatile memory module which includes a plurality of physical blocks, wherein a plurality of logical blocks are configured to map to a part of the physical blocks. The memory management circuit couples to the host system and the memory interface; configures a plurality of virtual block addresses to map to a part of the logical blocks; and provides the virtual block addresses to the host system. Furthermore, the memory management circuit receives a write command from the host system, wherein the write command instructs writing a file data to a plurality of first virtual block addresses of the virtual block addresses. The first virtual block addresses are mapped to a plurality of first logical blocks of the part of the logical blocks. The memory management circuit writes the file data to the physical blocks mapped to a plurality of second logical blocks of the logical blocks. The memory management circuit also determines whether a program failure is occurred when the file data is written to the physical blocks mapped to the second logical blocks. When the program failure is not occurred, the memory management circuit maps the first virtual block addresses to the second logical blocks.

Base on the above, the embodiments of the invention provided a data writing method for a memory controller and a memory storage device to ensure that the update of the data stored and scattered in a plurality of logical blocks is complete.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF THE EMBODIMENTS

Figure 1A:
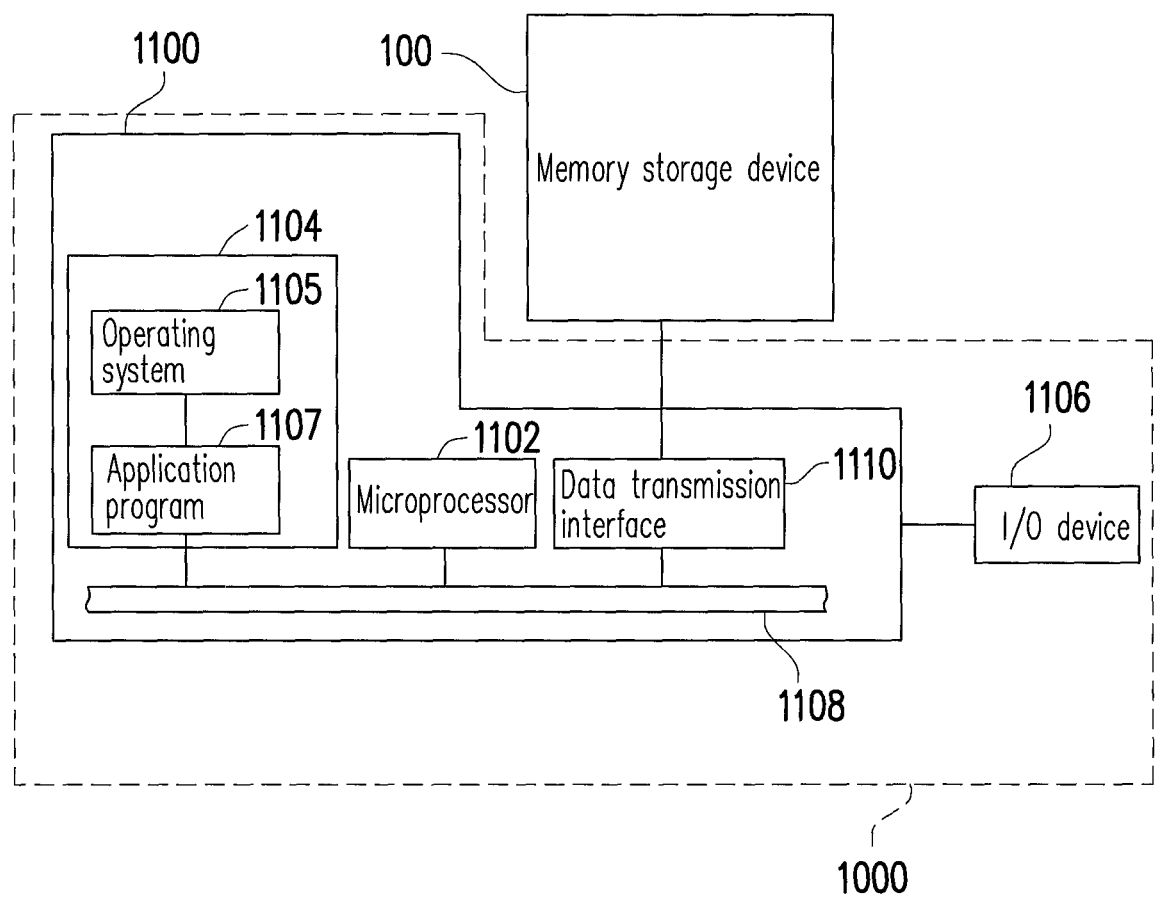
FIG. 1A illustrates a host system and a memory storage device according to a first exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

In general, a memory storage device (also referred to as a memory storage system) includes a rewritable non-volatile memory module and a controller (also referred to as a control circuit). The memory storage device is usually used together with a host system so that the host system can write data into or read data from the memory storage device.

FIG. 1A illustrates a host system and a memory storage device according to the first exemplary embodiment of the invention.

Figure 1B:
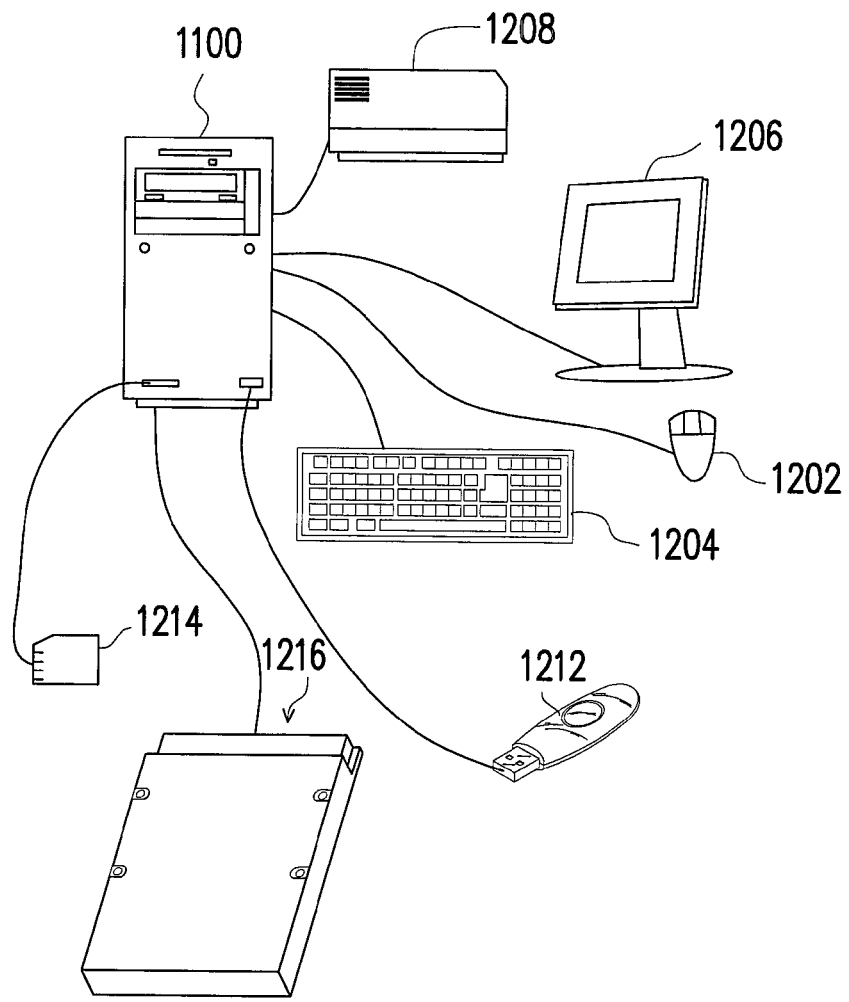
FIG. 1B is a diagram illustrating a computer, an input/output (I/O) device, and a memory storage device according to the first exemplary embodiment of the invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The microprocessor 1102 executes an operating system 1105 and an application program 1107 which are loaded in the RAM 1104, so the host system 1000 is enabled to provide the corresponding functions according to a user operation. The I/O device 1106 includes a mouse 1202, a keyboard 1204, a display 1206, and a printer 1208, as shown in FIG. 1B. It should be understood that the devices illustrated in FIG. 1B are not intended to limit the I/O device 1106, for the I/O device 1106 may further include other devices.

In the embodiments, the memory storage device 100 is coupled to other components of the host system 1000 through the data transmission interface 1110. Through the operations of the microprocessor 1102, the RAM 1104, and the I/O device 1106, data can be written into or read from the memory storage device 100. The memory storage device 100 may be a rewritable non-volatile memory storage device, such as the flash drive 1212, the memory card 1214, or the solid state drive (SSD) 1216 illustrated in FIG. 1B.

Figure 1C:
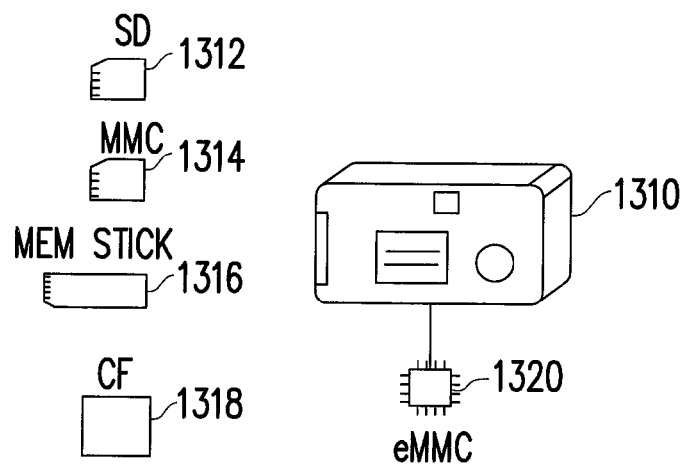
FIG. 1C is a diagram illustrating a host system and a memory storage device according to the first exemplary embodiment of the invention.

Generally speaking, the host system 1000 can be substantially any system that works together with the memory storage device 100 to store data. Even though in the present exemplary embodiment, the host system 1000 is described as a computer system, in another exemplary embodiment of the invention, the host system 1000 may also be a digital camera, a video camera, a communication device, an audio player, or a video player. For example, if the host system is a digital camera (video camera) 1310, the rewritable non-volatile memory storage device may be a secure digital (SD) card 1312, a multi media card (MMC) 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be noted that the eMMC is directly coupled to the motherboard of the host system.

Figure 2:
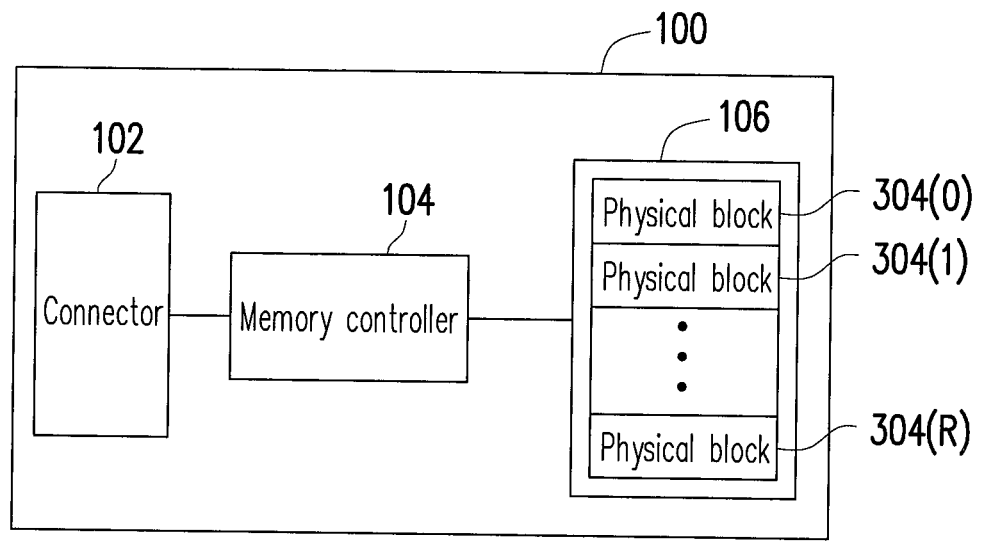
FIG. 2 is a schematic block diagram of the memory storage device in FIG. 1A.

FIG. 2 is a schematic block diagram of the memory storage device in FIG. 1A.

Referring to FIG. 2, the memory storage device 100 includes a connector 102, a memory controller 104, and a rewritable non-volatile memory module 106.

In the present exemplary embodiment, the connector 102 is compatible with Secure Digital (SD) interface standard. However, the invention is not limited thereto. The connector 10 could be also compatible with the standards of the Parallel Advanced Technology Attachment (PATA), the Institute of Electrical and Electronic Engineers (IEEE) 1394, the Peripheral Component Interconnect Express (PCI-e), the Universal serial bus (USB), the Serial Advanced Technology Attachment (SATA), Memory Stick (MS) interface, Multi-Media card (MMC) interface, Compact Flash (CF) interface, Integrated Device electronics (IDE), or any other suitable interfaces.

The memory controller 104 executes a plurality of logical gates or control instructions which are implemented in a hardware form or a firmware form, and performs data writing, reading, erasing, or other various data operations on the rewritable non-volatile memory module 106 according to instructions of the host system 1000.

The rewritable nonvolatile memory module 106 is coupled to the memory controller 104, and it is used to store the data written by the host system 1000. The rewritable non-volatile memory module 106 contains a plurality of physical blocks 304(0)~304(R). The physical block 304(0)~304(R) may belong to the same memory die or different memory dies. Each physical block contains a plurality of physical pages, and each physical page contains at least a physical sector, wherein the physical pages belonging to the same physical block can be written individually, but all the physical pages within the same physical block have to be erased all together. For example, each physical block is composed of 128 physical pages, and each physical page contains 8 physical sectors. In the other words, if each physical sector is 512 bytes, the size of each physical page will be 4 KB. However, the inventions are not limited thereto. Each physical block may also be composed with 64 physical pages, 256 physical pages, or any other number of physical pages.

To be specific, the physical block is the smallest unit for erasing data. That is each physical block contains the minimum amount of the memory cells that are to be erased together. The physical page is the smallest unit for programming data. Namely, the physical page is the smallest unit for writing data. However, in another exemplary embodiment of the invention, the smallest unit for writing data may also be the physical sector or other unit. Each physical page usually includes a data bit area and a redundancy bit area. The data unit area is used for storing user data, and the redundancy bit area is used for storing system data. (For example, error checking and correction code)

In this exemplary embodiment, the rewritable non-volatile memory module 106 is Multi-Level Cell (MLC) NAND flash memory module, and each memory cell stores at least 2 bits. However, the invention is not limited to thereto. The rewritable non-volatile memory module 106 may also be a Single Level Cell (SLC) NAND flash memory module, a Trinary Level Cell (TLC) NAND flash memory module, any other flash memory module, or any other memory modules that having the same characteristics.

Figure 3:
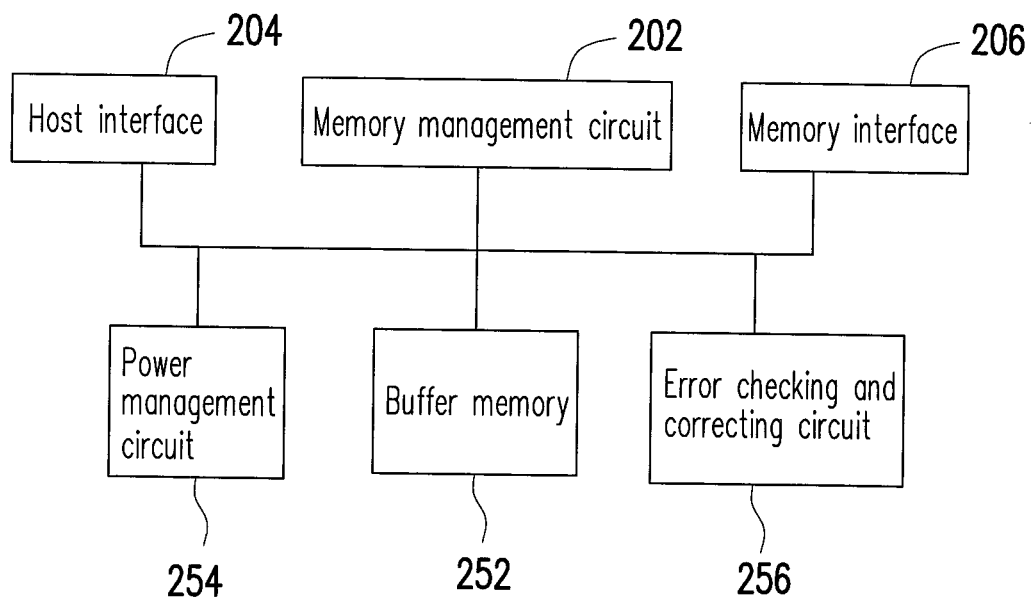
FIG. 3 is a schematic block diagram of a memory controller according to the first exemplary embodiment of the invention.

FIG. 3 is a schematic block diagram of a memory controller according to the first exemplary embodiment of the invention.

Referring to FIG. 3, the memory controller 104 includes a memory management circuit 202, a host interface 204, and a memory interface 206.

The memory management circuit 202 controls the operation of the memory controller 104. While the memory storage device 100 is operated, the memory management circuit 202 has a plurality of control instructions, which are been executed for the data writing, reading, erasing, and any other data operations.

In this exemplary embodiment, the control instructions of the memory management circuit 202 are implemented in a firmware form. For example, the memory management circuit 202 has a microprocessor unit (not shown) and a read-only memory (ROM, not shown), and the control instructions are burned into the ROM. When memory storage device 100 is in operation, the control instructions are executed by the microprocessor unit for the data writing, reading, erasing, and other operations.

In another exemplary embodiment of the invention, the control instructions are stored in a specific area (for example, a system area exclusively used for storing system data in a memory module) of the rewritable non-volatile memory module 106 as program codes. In addition, the memory management circuit 202 has a microprocessor unit (not shown), a ROM (not shown), and a RAM (not shown). Particularly, the ROM has a driving code. When the memory controller 104 is been enabled, the microprocessor unit will first execute the driving code to load the control instructions from the rewritable non-volatile memory module 106 into the RAM of the memory management circuit 202. And then the microprocessor unit runs the control instructions in order to proceed with data writing, reading, erasing, or any other data operations.

Additionally, in another exemplary embodiment of the invention, the control instructions of the memory management circuit 202 are implemented in a hardware form. For example, a memory management circuit 202 includes a microprocessor, a memory management unit, a memory writing unit, a memory reading unit, a memory erasing unit, and data processing unit. The memory management unit, the memory writing unit, the memory reading unit, the memory erasing unit, and data processing unit are coupled to the microprocessor. The memory management unit is used to manage the physical blocks of the rewritable non-volatile memory module 106; the memory writing unit is used to issue a write command for the data to be written into the rewritable non-volatile memory module 106; the memory reading unit is used to issue a read command for data to be read from the rewritable nonvolatile memory module 106; the memory erasing unit is used to issue an erase command for data to be erased from the rewritable nonvolatile memory module 106; and the data processing unit is used to process the data which are to be written to or read from the rewritable nonvolatile memory module 106

The host interface 204 is coupled to the memory management circuit 202 and configured for receiving and identifying the commands and data from the host system 1000. In other words, the commands and data transmitted by the host system 1000 are passed to the memory management circuit 202 through the host interface 204. In this embodiment of the invention, the host interface 204 is compatible with SD standard. However, the invention is not limited thereto. The Host interface 204 may also has the capability to be compatible with PATA, IEEE 1394, PCI-Express, USB, SATA, MS, MMC, CF, IDE, or other suitable data transmission standards.

The memory interface 206 is coupled to the memory management circuit 202 and configured for accessing the rewritable non-volatile memory module 106. In other words, data to be written to the rewritable non-volatile memory module 106 is converted to an acceptable format for the rewritable non-volatile memory module 106 by the memory interface 206.

In an exemplary embodiment of the invention, the memory controller 104 further includes a buffer memory 252, a power management circuit 254, and error checking and correcting circuit (ECC circuit) 256.

The buffer memory 252 is coupled to the memory management circuit 202 and configured to temporarily store the data and commands from the host system 1000 or the data from the rewritable non-volatile memory module 106.

The power management circuit 254 is coupled to the memory management circuit 202 and configured for controlling the power supply of the memory storage device 100

The ECC circuit 256 is coupled to the memory management circuit 202 and configured for executing an ECC procedure to ensure the data correctness. In detail, when the memory management circuit 202 receives a write command from the host system 1000, the ECC circuit 256 generates a corresponding error checking and correcting code (ECC Code) for the data corresponding to the write command. And then the memory management circuit 202 writes the data corresponding to the write command and its corresponding ECC Code into the rewritable non-volatile module 106. Subsequently, when the memory management circuit 202 reads the data from the rewritable non-volatile memory module 106, both the data and its corresponding ECC Code are read simultaneously. The ECC circuit 256 will execute the ECC procedure on the read data based on its corresponding ECC Code.

Figure 4:
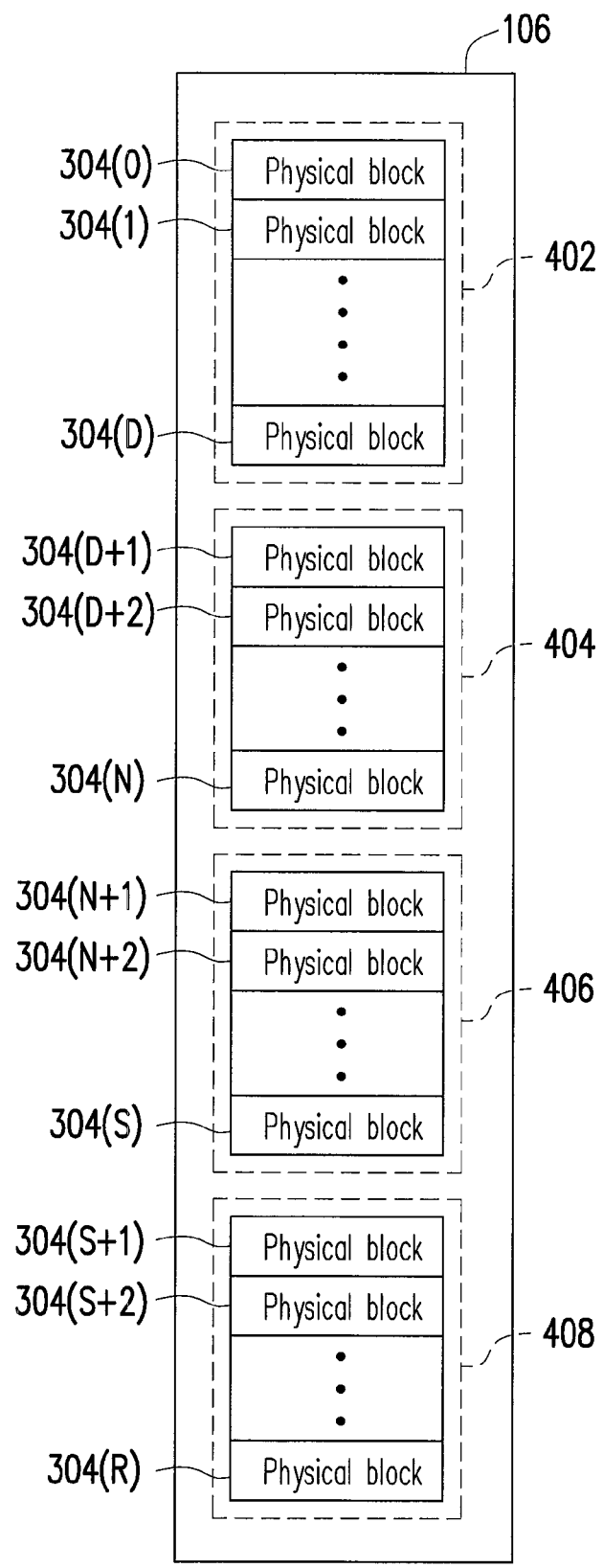
FIGS. 4 and 5 is a diagram illustrating the models of how the rewritable non-volatile memory module is managed according to the first exemplary embodiment of the invention.
Figure 5:
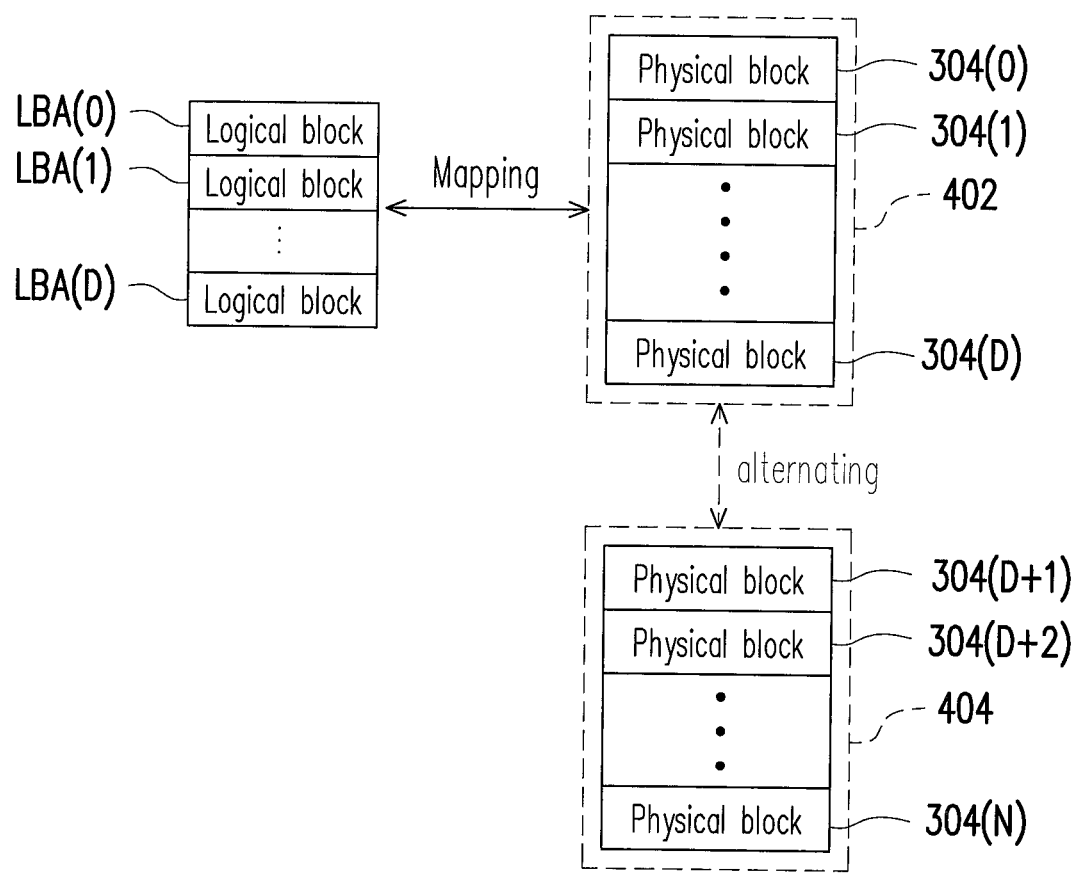

FIGS. 4 and 5 is a diagram illustrating the models of how the rewritable non-volatile memory module is managed according to the first exemplary embodiment of the invention.

During the operation of the physical blocks of the rewritable non-volatile memory module 106, the usage of the "select", "substitute", "group", "alternate", and any other terms for the operation of the physical block is a logical concept. In other words, the actual location of the physical blocks of the rewritable non-volatile memory module do not change, but the physical blocks of the rewritable non-volatile memory module are operated logically.

Referring to FIG. 4, the memory controller 104 logically groups the physical blocks 304(0)-304(R) into a data area 402, a spare area 404, a system area 406, and a replacement area 408.

The physical blocks of the data area 402 and the spare area 404 are used for storing the data from the host system 1000. In detail, physical blocks in the data area 402 already contain data, and the physical blocks of the spare area 404 are used to substitute the physical blocks of the data area 402. Therefore, the physical blocks of the spare area 404 are blank or available physical blocks, which are not recorded with data nor labeled as invalid data. Namely, erasing operations have been performed on the physical blocks in the spare area 404, or when the physical blocks in the spare area 404 are selected for storing data, erasing operations are first performed on the selected physical blocks. Therefore, the physical blocks of the spare area 404 are available physical blocks.

The physical blocks logically belonging to the system area 406 are used for recording system data, which includes the manufacturer and model of the memory die, the number of the physical blocks in the memory die, and number of the physical page in each physical block.

The physical blocks logically belonging to the replacement area 408 are replacement physical blocks. For example, when the rewritable nonvolatile memory module 106 is manufactured in the factory, 4% of the physical blocks thereof are reserved for replacement. In other words, when the physical blocks are damaged within the data area 402, spare area 404, and the system area 406, the physical blocks of the replacement area 408 are used to replace any damaged physical blocks (referred to as bad block). Thus, if there are still normal physical blocks in the replacement area 306 and a physical block is damaged, the memory controller 104 gets a normal physical block from the replacement area 408 for replacing the damaged physical block. If there is no more normal physical block in the replacement area 306 and a physical block is damaged, the memory storage device 100 is announced as being in a write-protect status and cannot be used for writing data anymore.

Particularly, the number of the physical blocks in the data area 402, the spare area 404, the system area 406, and the replacement area 408 changes according to the different memory specifications. Furthermore, during the operation of the memory storage device 100, the grouping relationship of the physical blocks associated to the data area 402, the spare area 404, the system area 406, and the replacement area 408 changes dynamically. For example, when the damaged physical blocks of the spare area are replaced by the physical blocks of the replacement area, then physical blocks originally in the replacement area are associated to the spare area.

Referring to FIG. 5, as described above. The physical blocks of the data area 402 and the spare area 404 are used in an alternating way to store the data written by the host system 1000. In this embodiment of the invention, the memory management circuit 202 of the memory controller 104 configures a plurality of logical blocks LBA(0)-LBA(D) to benefit the data accessing of the physical blocks where data is stored in the alternating way described above. In detail, the logical bock LBA(0)-LBA(D) have a plurality of physical pages respectively, and the logical blocks LBA(0)-LBA(D) are initially mapped to the physical blocks 304(0)-304(D) of the data area 402, where a logical block is mapped to a physical block of the data area 402. For example, the memory management circuit 202 creates a logical block-physical block mapping table to record the mapping relationship between the logical blocks and physical blocks.

In the exemplary embodiment of the invention, the memory management circuit 202 of the memory controller 104 partitions the logical block LBA(0)-LBA(D) into a storage area and a buffer area. The memory management circuit 202 configures the virtual block addresses to map to the logical blocks of the storage area and provides the virtual blocks addresses to the application programs of the host system 1000 for data accessing, where one virtual block address maps to one logical block. The logical blocks of the storage area and buffer area are mapped to the virtual block addresses in an alternating way. Namely, when a logical block formerly associated to the buffer area is mapped to a virtual block address now, this logical block will be associated to the storage area; and when a logical block formerly associated to the storage area is not mapped to a virtual block address now, this logical block will be associated to the buffer area.

Figure 6:
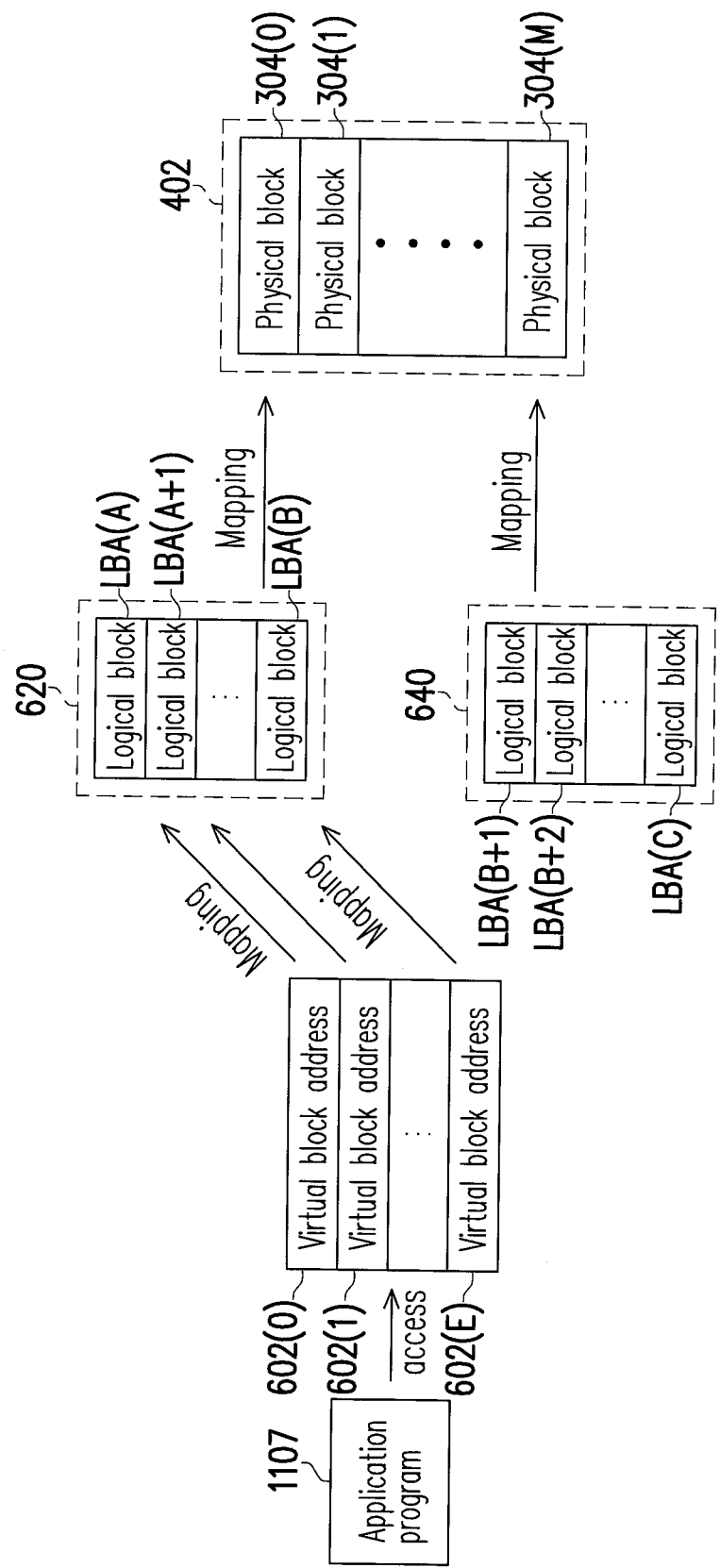
FIG. 6 is a diagram illustrating the virtual block addresses accessed by the application program of the host system according the first exemplary embodiment.

FIG. 6 is a diagram illustrating the virtual block addresses are accessed by the application program of the host system of the first exemplary embodiment.

Referring to FIG. 6, the logical blocks LBA(0)-LBA(D) are grouped into the storage area 620 and the buffer area 640 by the memory management circuit 202. For example, the storage area 620 includes logical blocks LBA(A)-LBA(B), and the buffer area 640 includes logical blocks LBA(B+1)-LBA(C). The memory management circuit 202 maps the logical blocks of the storage area 620 and the buffer area 640 to the physical blocks 304(0)-304(M) of the data area 402. Particularly, the memory management circuit 202 configures the virtual block addresses 602(0)-602(E) to map to the logical blocks LBA(A)-LBA(B) of the storage area 620, and provides the virtual block addresses 602(0)-602(E) to the application program 1107 installed in the host system 1000 to access. However, the host system 1000 is unable to access the logical block LBA(B+1)-LBA(C), because the virtual block addresses 602(0)-602(E) is only mapped to the logical block LBA(A)-LBA(B).

In this exemplary embodiment, the logical blocks LBA(0)-LBA(D) are grouped into the storage area 620 and the buffer area 640 only for illustration. However the invention is not limited thereto. In the other exemplary embodiment of the invention, the logical blocks LBA(0)-LBA(D) may be further grouped into other areas to manage. Furthermore, the invention is not limited to the number of the logical blocks in the storage areas 620 and the buffer area 640.

For example, in an exemplary embodiment, the memory management circuit 202 creates a virtual-logical mapping table to record the mapping relationship between the virtual block addresses 602(0)-602(E) and the logical blocks LBA(A)-LBA(B) of the storage area 620.

Figure 7:
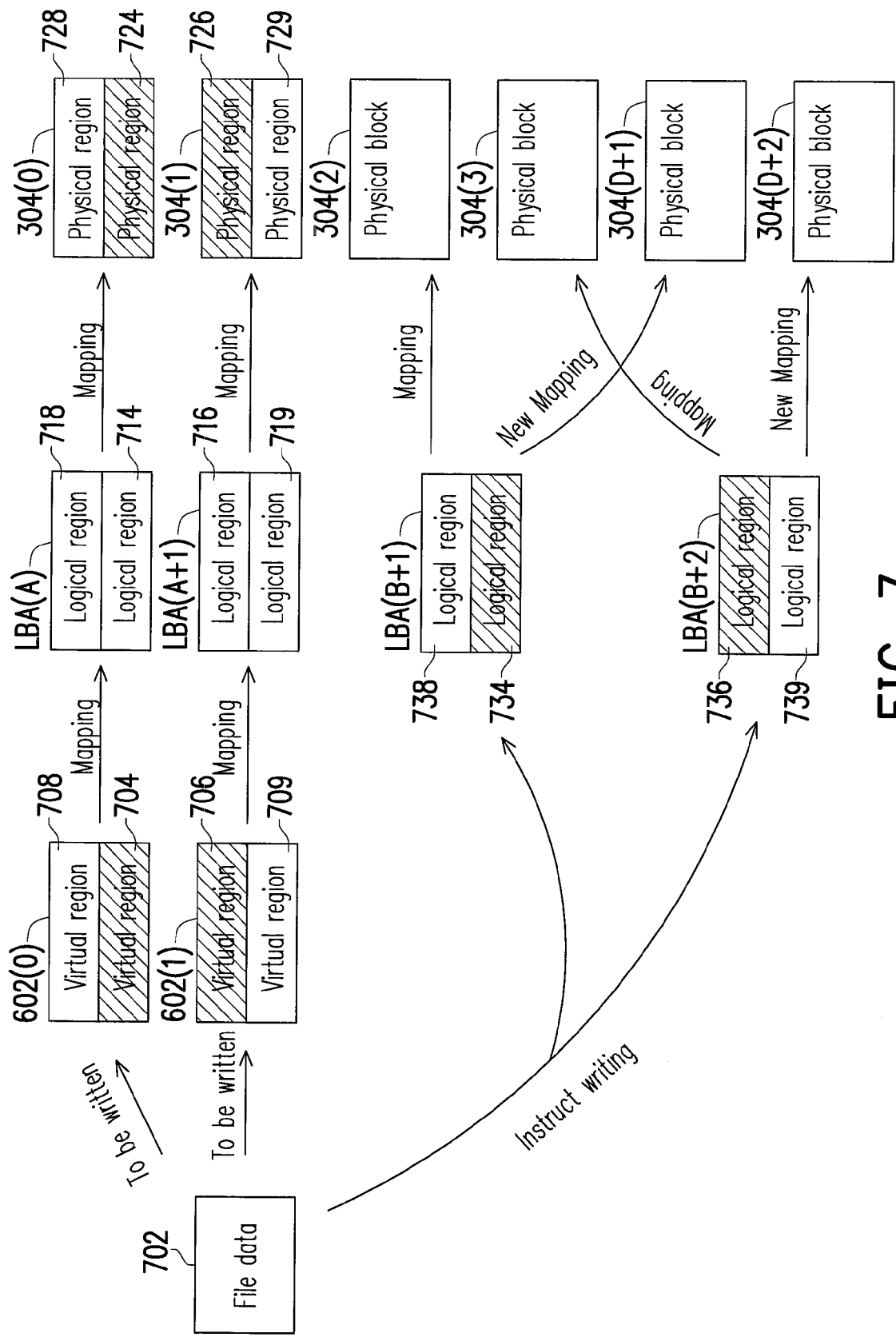
FIG. 7 is a diagram illustrating the adjustment of the mapping relationship between the logical blocks and physical blocks during the write operation according the first exemplary embodiment.

FIG. 7 is a diagram illustrating the adjustment of the mapping relationship between the logical blocks and physical blocks during the write operation according to the first exemplary embodiment.

Referring to FIG. 7, assuming that the application program 1107 issues a write command to the memory storage device 100 for writing the file data 702 into the virtual block address 602(0) of the virtual region 704 and the virtual block address 602(1) of the virtual region 706. (herein, the virtual block addresses 602(0) and 602(1) are referred to first virtual block addresses.) In other words, the file data 702 includes a plurality of fragments stored respectively into the virtual region 704 and virtual region 706 by the application program 1107. For example, each of the virtual region 704 and the virtual region 706 includes one or a plurality of virtual addresses for the application program 1107 to access. In this exemplary embodiment, the file data 702 that is to be written into the virtual region 704 and virtual region 706 belongs to the same file. Therefore, the memory management circuit 202 has the capability to ensure the completeness of the updates of the file data which are stored in the virtual region 704 and virtual region 706.

For example, after receiving the write command, the memory management circuit 202 obtains the logical block LBA(A) mapped to the virtual block address 602(0) and the logical block LBA(A+1) mapped to the virtual block address 602(1) (at this point, the logical block LBA(A) and LBA(A+1) are referred to first logical blocks) according to the virtual-logical mapping table. In FIG. 7, the logical block LBA(A) and LBA(A+1) are mapped to the physical blocks 304(0) and 304(1) of the data area 402 respectively (at this point, the physical blocks 304(0) and 304(1) are referred to first physical blocks.) The logical block LBA(A) includes the logical region 718 mapped to the virtual region 708 and the logical region 714 mapped to the virtual region 704. The logical block LBA(A+1) includes the logical region 716 mapped to the virtual region 706 and the logical region 719 mapped to virtual region 709. Furthermore, the logical region 718 is originally mapped to the physical region 728 of the physical block 304(0); the logical region 714 is originally mapped to the physical region 724 of the physical block 304(0); the logical region 716 is originally mapped to the physical region 726 of the physical block 304(1); and the logical region 719 is originally mapped to the physical region 729 of the physical block 304(1).

From the above mapping relationship, the application program 1107 updates the stored data in the physical region 724 and physical region 726 according to the file data 702. However, in the other embodiment, the virtual region 708 is mapped to the logical region 714, and the logical region 718 is mapped to the physical region 724, the invention is not limited the mapping relationship between the virtual regions, logical regions, and physical regions.

In this exemplary embodiment, after receiving the write command, the memory management circuit 202 writes the file data 702 into the physical blocks mapped to the logical blocks LBA(B+1) and LBA(B+2) (referred to second logical blocks) of the buffer area 640. In detail, the logical block LBA(B+1) includes a logical region 738 and a logical region 734, and the logical block LBA(B+2) includes a logical region 736 and logical region 739. The logical block LBA(B+1) is originally mapped to the physical block 304(2) of the data area 402, and the logical block LBA(B+2) is originally mapped to the physical block 304(3) of the data area 402 (at this point, the physical block 304(2) and 304(3) are referred to second physical blocks.) The memory management circuit 202 issues a write command to the rewritable non-volatile memory module 106 for writing the file data 702 to the physical regions corresponding to the logical regions 734 and logical region 736. The physical blocks require to be erased before new data to be written, so the memory management circuit 202 will select the physical blocks 304(D+1) and 304(D+2) from the spare area 404 for the file data 702 to be written (at this point, the physical blocks 304(D+1) and 304(D+2) are referred to as third physical blocks.) However, the invention is not limited thereto. The invention can also utilize the second physical block (physical blocks 304(2) and 304(3)) for the file data 702 to be written.

In this exemplary embodiment, one logical region includes one or a plurality of logical addresses, a physical block includes one or a plurality of physical addresses. The logical addresses in the logical regions are mapped to the virtual addresses in the virtual regions and the physical addresses in the physical regions. For example, the logical region 718 includes one or a plurality of logical addresses which are mapped to one or a plurality of the virtual addresses of the virtual region 708 and one or a plurality of the physical addresses of the physical region 728.

Figure 8:
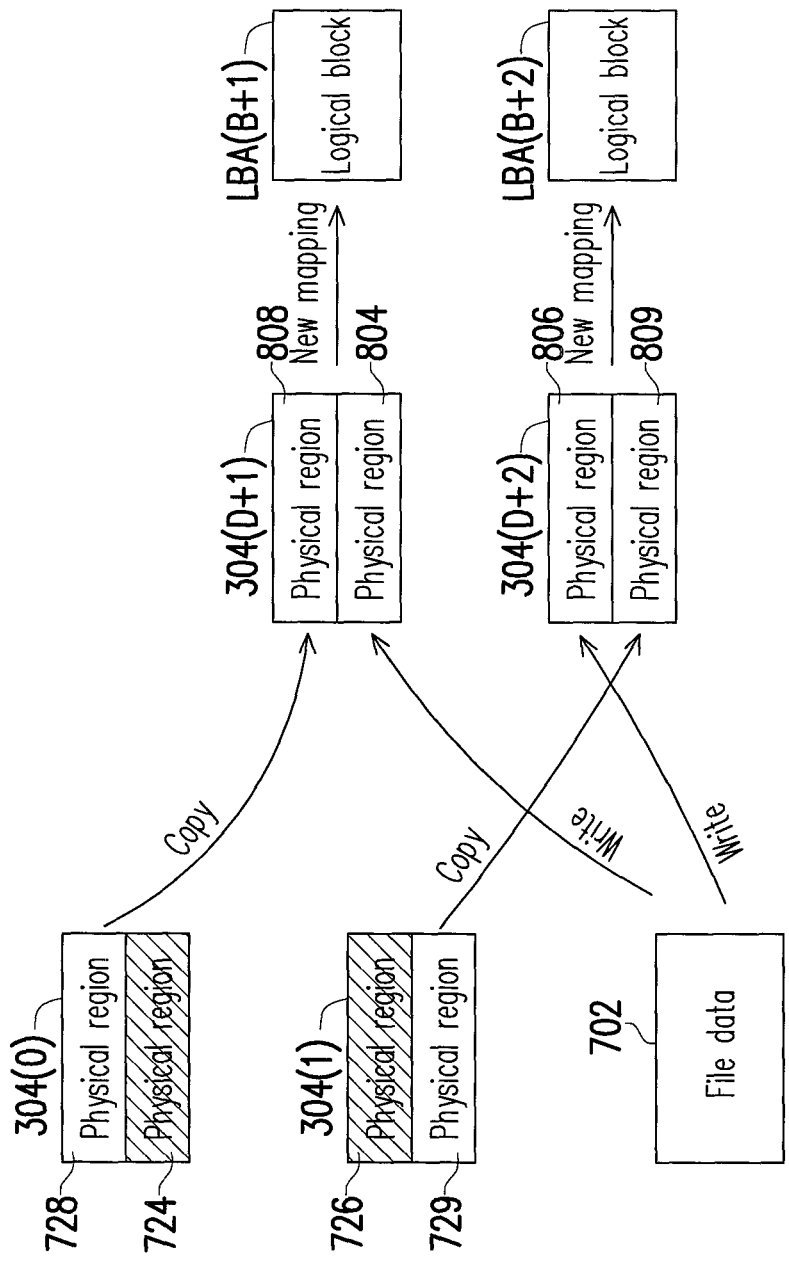
FIG. 8 is a diagram illustrating the file data written into the physical blocks according to FIG. 7.

FIG. 8 is a diagram illustrating the file data written into the physical blocks according to FIG. 7.

Referring to FIG. 8, the physical blocks 304(0) and 304(1) which the logical regions LBA(A) and LBA(A+1) originally mapped to have file data that has not been updated (referred to as valid data). So, the memory management circuit 202 also copies the valid data (i.e. the stored data in the physical regions 728 and 729) to the physical blocks 304(D+1) and 304(D+2), other than writes the file data 702 into the physical blocks 304(D+1) and 304(D+2). On the other hand, the physical pages included in a physical blocks must be programmed sequentially. So, the memory management circuit 202 copies the valid data stored in the physical region 728 to the physical region 808 first, and then write a part of the file data 702 to the physical region 804. Similarly, the memory management circuit 202 will write the other part of the file data 702 to the physical region 806 first, and then copy the valid data stored in the physical region 729 to the physical region 809. At the end, the memory management circuit 202 will re-map the physical block 304(D+1) to the logical block LBA(B+1) and re-map the physical block 304(D+2) to the logical block LBA(B+2).

Referring back to the FIG. 7, after the logical block LBA(B+1) and LBA(B+2) are remapped to the physical 304(D+1) and 304(D+2), the memory management circuit 202 associates the physical blocks 304(D+1) and 304(D+2) to the data area 402, and associates the physical blocks 304(2) and 304

(3) to the spare area 404. In other words, the physical blocks 304(2) and 304(3) contain old data, they can be associated to the spare area 404, and the physical blocks 304(2) and 304(3) can be used to execute the next write or other operations for writing data after they are erased. After a successful programming (i.e. a program failure is not occurred) of the physical blocks 304(D+1) and 304(D+2), the memory management circuit 202 remaps the virtual block address 602(0) to the logical block LBA(B+1) and remaps the virtual block address 602(1) to the logical block LBA(B+2).

In the exemplary embodiment, in the occurrence of the program failure while the file data 702 is written into the physical blocks 304(D+1) and 304(D+2), the memory management circuit 202 will maintain the mapping relationship between the virtual block addresses 602(0) and 602(1) and the logical blocks LBA(A) and LBA(A+1), and then send an error message to the host system 1000 to respond to the received write command. In detail, the stored data of the virtual regions 704 and 706 belong to same files. So the stored data of the virtual regions 704 and 706 must be checked for its completeness (i.e. all of the data are old data or all of the data are updated data). Therefore, in this exemplary embodiment, the memory management circuit 202 will remap the virtual block addresses 602(0) and 602(1) to the logical blocks LBA (B+1) and LBA(B+2) to ensure the stored data in the virtual regions 704 and 706 are updated after the physical blocks 304(D+1) and 304(D+2) are programmed successfully. Before any of the physical blocks 304(D+1) and 304(D+2) is programmed completely, the memory management circuit 202 will maintain the mapping relationship between the virtual block addresses 602(0) and 602(1) and the logical blocks LBA(A) and LBA(A+1) to ensure the stored data in the virtual regions 704 and 706 are old data.

After the successful programming are confirmed and the remapping of the virtual block addresses 602(0) and 602(1) to the logical blocks LBA(B+1) and LBA(B+2), the memory management circuit 202 will associate the logical blocks LBA(A) and LBA(A+1) to the buffer area 640 and the logical blocks LBA(B+1) and LBA(B+2) to the storage area 620. In other words, the stored data in the logical blocks LBA(A) and LBA(A+1) are invalid, so they can be associated to the buffer area 640 and utilized for executing the next write command.

In another exemplary embodiment, while the file data 702 is instructed to be written to the physical blocks which the logical blocks LBA(B+1) are mapped to, the memory management circuit 202 is able to write the data that belongs to the logical regions 734 first, and then copy the valid data belonging to the logical region 718 to the physical block mapped to the logical region 738. However, the invention is not limited thereto.

This exemplary embodiment allots all the virtual block addresses for an application program installed in the host system to access; however, the invention is not limited thereto. In an exemplary embodiment, the host system 1000 can execute a plurality of application programs. The memory management circuit 202 will allot a plurality of virtual block addresses to each application program. The memory management circuit 202 will also creates a virtual-logical mapping table for each application program. In this way, when the memory management circuit 202 receives a write command from each application program for accessing the virtual block addresses, the correctly mapped logical blocks can be obtained according to its virtual-logical mapping table.

Figure 9:
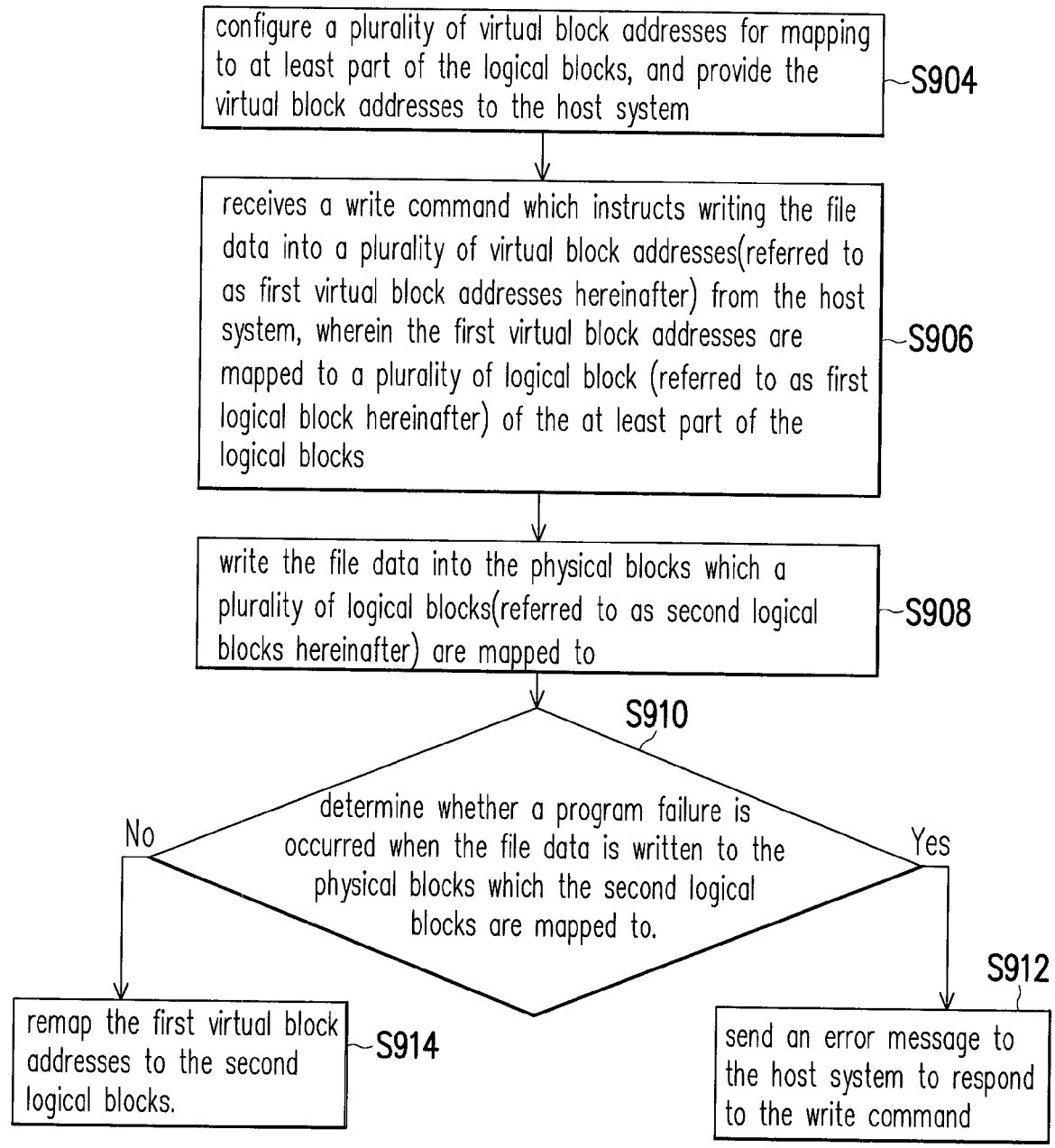
FIG. 9 is a flow diagram illustrating the data writing method of an exemplary embodiment of the invention.

FIG. 9 is a flow diagram illustrating the data writing method of an exemplary embodiment of the invention.

Referring to FIG. 9, in the step S904, the memory management circuit 202 configures a plurality of virtual block addresses 602(0)-602(E) for mapping to at least a part of the logical blocks (e.g. storage area 620), and provides the virtual block addresses 602(0)-602(E) to the host system 1000.

In the step S906, the memory management circuit 202 receives a write command which instructs writing the file data into a plurality of virtual block addresses (referred to as first virtual block addresses hereinafter) from the host system. The first virtual block addresses are mapped to a plurality of logical blocks among the at least the part of the logical blocks (referred to as first logical blocks hereinafter).

In the step S908, the memory management circuit 202 writes the file data into the physical blocks which a plurality of logical blocks (referred to as second logical blocks hereinafter) are mapped to. The operation of writing the data into the physical blocks which the second logical blocks are mapped to is described in detail above with FIG. 8, so it is not repeated here.

In the step S910, the memory management circuit 202 determines whether a program failure is occurred when the file data is written to the physical blocks which the second logical blocks are mapped to. If the program failure occurs, in the step S912, the memory management circuit 202 sends an error message to the host system 1000 to respond to the write command.

If the program failure does not occur, in the step S914, the memory management circuit 202 remaps the first virtual block addresses to the second logical blocks. This operation was described in detail with FIG. 7 above, hence it is not repeated here.

Second Exemplary Embodiment

The second exemplary embodiment is similar to the first exemplary embodiment, and only the difference between two exemplary embodiments is further described below. In the first exemplary embodiment, the logical blocks of the storage area and buffer area are mapped to the physical blocks of the data area. However, in the second exemplary embodiment, the logical blocks of the storage area are mapped to the physical blocks of the data area, and the logical blocks of the buffer area are mapped to the physical blocks of the spare area.

Figure 10:
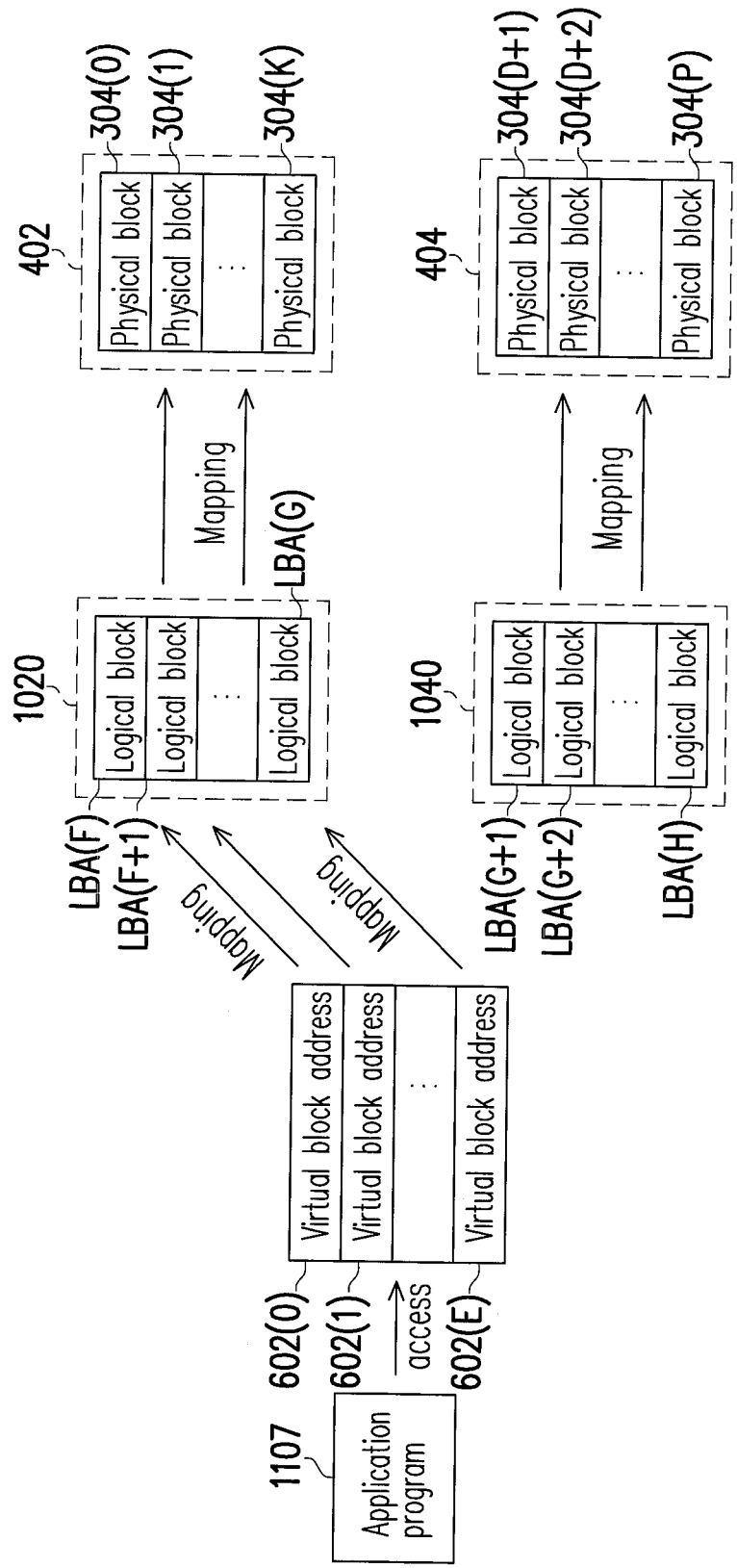
FIG. 10 is a diagram illustrating the virtual block addresses accessed by the application program of the host system according to a second exemplary embodiment of the invention.

FIG. 10 is a diagram illustrating the virtual block addresses accessed by the application program of the host system according to a second exemplary embodiment.

Referring to FIG. 10, the memory management circuit 202 groups the logical blocks LBA(0)-LBA(D) into at least storage area 1020 and buffer area 1040. The storage area 1020 includes logical blocks LBA(F)-LBA(G), and the buffer area 1040 includes the logical blocks LBA(G+1)-LBA(H). The logical blocks LBA(F)-LBA(G) are mapped to the physical blocks 304(0)-304(K) of the data area 402, and the logical blocks LBA(G+1)-LBA(H) are mapped to the physical blocks 304(D+1)-304(P) of the spare area 404. In this exemplary embodiment, the allotted virtual block addresses 602(0)-602(E) for the application program 1107 are mapped to the logical blocks LBA(F)-LBA(G) of the storage area 1020 only. So the application program 1107 is unable to access the logical blocks LBA(G+1)-LBA(H) of the buffer area 1040 directly. The same as the first exemplary embodiment is, when the memory management circuit 202 receives a write command instructing to write a file data into a virtual block address, the file data is written into the buffer area 1040 first. After writing the file data and a program failure is not occurred, the memory management circuit 202 will then change the mapping relationship between the virtual block addresses and the logical blocks.

Figure 11:
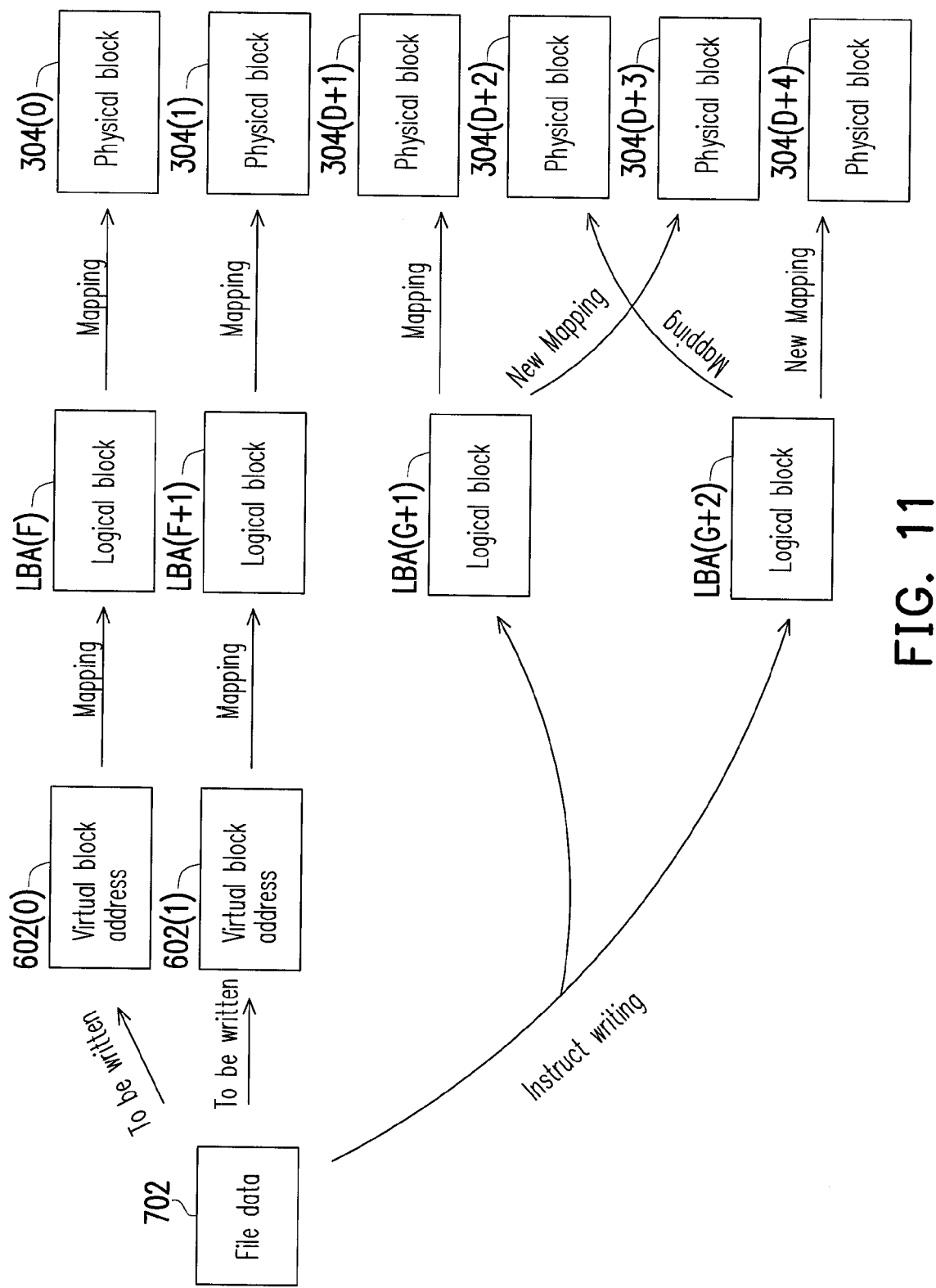
FIG. 11 is a diagram illustrating the adjustment of the mapping relationship between the logical blocks and physical blocks during the write operation according to the second exemplary embodiment.

FIG. 11 is a diagram illustrating the adjustment of the mapping relationship between the logical blocks and physical blocks during the write operation according to the second exemplary embodiment.

Referring to FIG. 11, after receiving a write command which instructs to write the file data 702 to the virtual block addresses 602(0)-602(1)(referred to as first virtual block addresses), the memory management circuit 202 will obtain a logical blocks LBA(F) which the virtual block address 602(0) is mapped to and a logical block LBA(F+1) which the virtual block address 602(1) is mapped to according to the virtual-logical mapping table (at this point, the logical blocks LBA (F) and LBA(F+1) are referred to as first logical blocks.) The logical block LBA(F) is originally mapped to the physical blocks 304(0), the logical block (F+1) is originally mapped to the physical block 304(1). In other words, in this exemplary embodiment, the host system 1000 wants to update the stored data in the physical blocks 304(0) and 304(1) according to the file data 702. Particularly, the memory management circuit 202 instructs to write the file data 702 into the logical blocks LBA(G+1), LBA(G+2) (collectively referred to as a second logical block). The logical block LBA(G+1) is originally mapped to the physical block 304(D+1), and the logical block LBA(G+2) is originally mapped to the physical block 304(D+2). A physical block must be erased first before it is written again, so the memory management circuit 202 selects the physical blocks 304(D+3) and 304(D+4) to write the file data 702.

The memory management circuit 202 copies the valid data which is stored in the physical block 304(0) to the physical block 304(D+3), and writes a part of the file data 702 to the physical block 304(D+3). The memory management circuit 202 also copies the valid data stored in the physical block 304(1) to the physical block 304(D+4), and writes the other part of the file data 702 to the physical block 304(D+4). During writing the file data 702 to physical blocks 304(D+3) and 304(D+4), the memory management circuit 202 determines whether a program failure is occurred. If not, the virtual block addresses 602(0) is mapped to the logical block LBA (G+1), and the virtual block address 602(1) is mapped to the logical block LBA(G+2). Furthermore, the logical blocks LBA(G+1) and LBA(G+2) are associated to the storage area 1020, and the logical blocks LBA(F), LBA(F+1) are associated to the buffer area 1040. In this way, the completeness of the data which are stored in the virtual block addresses 602(0) and 601(1) are ensured.

The difference from the first exemplary embodiment is, the physical blocks 304(D+1) and 304(D+2), which the logical blocks LBA(G+1) and LBA(G+2) are originally mapped to, belong to the spare area 404. So in this exemplary embodiment, the memory management circuit 202 may copy the valid data stored in the physical block 304(0) to the physical block 304(D+1), and write a part of the file data 702 to the physical block 304(D+1). Furthermore, the memory management circuit 202 will copy the valid data that is stored in the physical block 304(1) to the physical block 304(D+2), and write the other part of the file data 702 to the physical block 304(D+2).

In summary, a data writing method for the memory controller and the memory storage device provided by the exemplary embodiments of the invention is to separate the file data writing process into 3 levels to manage which are virtual block addresses, logical blocks, and physical blocks. Furthermore, the mapping relationship between the virtual block addresses and the logical blocks are updated only when the programming process of the physical blocks are diagnosed with no program failures. In this way, when a program failure occurs in the case that the file data is written to a plurality of corresponding physical blocks, the incomplete update of the file data can be avoid. According to describe above, the present invention can ensure the update completeness of the file data.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the invention cover modifications and variations of this invention provided they fall within the scope of the following claims and their equivalents.

What is claimed is:

1. A data writing method, for a rewritable non-volatile memory module comprising a plurality of physical blocks, wherein a plurality of logical blocks are configured to map to a part of the physical blocks, the data writing method comprising:

configuring a plurality of virtual block addresses to map to at least a part of the logical blocks and providing the virtual block addresses to a host system;

receiving a write command from the host system, wherein the write command instructs to write a file data to a plurality of first virtual block addresses of the virtual block addresses, and the first virtual block addresses are mapped to a plurality of first logical blocks among the at least the part of the logical blocks;

writing the file data to the physical blocks mapped to a plurality of second logical blocks of the logical blocks;

determining whether a program failure is occurred when the file data is written to the physical blocks mapped to the second logical blocks; and if the program failure is not occurred, mapping the first virtual block addresses to the second logical blocks.

2. The data writing method according to claim 1 further comprises:

grouping the logical blocks into at least a storage area and a buffer area, wherein the at least the part of the logical blocks belong the storage area, and the second logical blocks belong to the buffer area, wherein the step of if the program failure is not occurred, mapping the first virtual block addresses to the second logical block further comprises:

associating the second logical blocks to the storage area, associating the first logical blocks to the buffer area.

3. The data writing method according to claim 2 further comprises:

creating a virtual-logical mapping table for recording a mapping relationship between the virtual block addresses and the logical blocks of the storage area.

4. The data writing method according to claim 3, wherein the step of configuring the virtual block addresses to map to the logical blocks of the storage area and providing the virtual block addresses to the host system comprises:

providing the virtual block addresses to a plurality of application programs executed in the host system, wherein the step of creating the virtual-logical mapping table comprises:

creating the virtual-logical mapping table for each of the application programs.

5. The data writing method according to claim 1 further comprises:

grouping the physical blocks into at least a data area and a spare area, wherein the logical blocks are mapped to the physical blocks of the data area, the first logical blocks are mapped to a plurality of first physical blocks of the physical blocks of the data area, and the second logical blocks are mapped to a plurality of second physical blocks of the physical blocks of the data area.

6. The data writing method according to claim 5, wherein the step of writing the file data to the physical blocks mapped to the second logical blocks of the logical blocks comprises:
   selecting a plurality of third physical blocks from the physical blocks of the spare area;
   writing the file data to the third physical blocks;
   remapping the second logical blocks to the third physical blocks; and
   associating the second physical blocks to the spare area and associating the third physical blocks to the data area.

7. The data writing method according to claim 6 further comprises:
   copying valid data belonging to the first logical blocks from the first physical blocks to the third physical blocks.

8. The data writing method according to claim 1 further comprises:
   if the program failure is occurred, sending an error message to the host system to respond to the write command.

9. The data writing method according to claim 1, wherein the first logical blocks are mapped to a plurality of first physical blocks of the physical blocks, the second logical blocks are mapped to a plurality of second physical blocks of the physical blocks, and the step of writing the file data into the physical blocks mapped to the second logical blocks of the logical blocks comprises:
   writing the file data to the second physical blocks; and
   copying valid data belonging to the first logical blocks from the first physical blocks to the second physical blocks.

10. A memory storage device comprising:
   a connector, configured to couple to a host system;
   a rewritable non-volatile memory module including a plurality of physical blocks, wherein a plurality of logical blocks are configured to map to a part of the physical blocks; and
   a memory controller, coupled to the connector and the rewritable non-volatile memory module,
   wherein the memory controller configures a plurality of virtual block addresses to map to at least a part of the logical blocks, and provides the virtual block addresses to the host system,
   wherein the memory controller receives a write command from the host system, wherein the write command instructs to write a file data to a plurality of first virtual block addresses of the virtual block addresses, and the first virtual block addresses are mapped to a plurality of first logical blocks among the at least the part of the logical blocks,
   wherein the memory controller writes the file data to the physical blocks mapped to a plurality of second logical blocks of the logical blocks,
   wherein the memory controller determines whether a program failure is occurred when the file data is written to the physical blocks mapped to the second logical blocks,
   when the program failure is not occurred, the memory controller maps the first virtual block addresses to the second logical blocks.

11. The memory storage device according to claim 10, wherein the memory controller is configured to group the logical blocks into at least a storage area and a buffer area, wherein the at least the part of the logical blocks belong the storage area, and the second logical blocks belongs to the buffer area,
   when the program failure is not occurred, the memory controller associates the second logical blocks to the storage area and associates the first logical blocks to the buffer area.

12. The memory storage device according to claim 11, wherein the memory controller is further configured to create a virtual-logical mapping table to record a mapping relationship between the virtual block addresses and the logical blocks of the storage area.

13. The memory storage device according to claim 12, wherein the memory controller is further configured to provide the virtual block addresses to a plurality of application programs executed in the host system, and create the virtual-logical mapping tables for each of the application programs.

14. The memory storage device according to claim 10, wherein the memory controller is further configured to logically group the physical blocks into at least a data area and a spare area, wherein the logical blocks are mapped to the physical blocks of the data area, the first logical blocks are mapped to a plurality of first physical blocks of the physical blocks of the data area, and the second logical blocks are mapped to a plurality of second physical blocks of the physical blocks of the data area.

15. The memory storage device according to claim 14, wherein when writing the file data to the physical blocks mapped to the second logical blocks of the logical blocks, the memory controller is further configured to select a plurality of third physical blocks from the physical blocks of the spare area, write the file data into the third physical blocks, remap the second logical blocks to the third physical blocks, associate the second physical blocks to the spare area, and associate the third physical area to the data area.

16. The memory storage device according to claim 15, wherein the memory controller is further configured to copy valid data, which belongs to the first logical blocks, from the first physical blocks to the third physical blocks.

17. The memory storage device according to claim 10, wherein the memory controller is further configured to send an error message to the host system to respond to the write command when the program failure is occurred.

18. A memory controller comprising:
   a host interface, coupled to a host system;
   a memory interface, coupled to a rewritable non-volatile memory module, wherein the rewritable non-volatile memory module includes a plurality of physical blocks, wherein a plurality of logical blocks are configured to map to a part of the physical blocks; and
   a memory management circuit, coupled to the host interface and memory interface,
   wherein the memory management circuit configures a plurality of virtual block addresses to map to at least a part of the logical blocks, and provides the virtual block addresses to the host system,
   wherein the memory management circuit receives a write command from the host system, wherein the write command instructs to write a file data to a plurality of first virtual block addresses of the virtual block addresses, and the first virtual block addresses are mapped to a plurality of first logical blocks among the at least the part of the logical blocks,
   wherein the memory management circuit writes the file data to the physical blocks mapped to a plurality of second logical blocks of the logical blocks, wherein the memory management circuit determines whether a program failure is occurred when the file data is written to the physical blocks mapped to the second logical blocks, when the program failure is not occurred, the memory management circuit maps the first virtual block addresses to the second logical blocks.

19. The memory controller according to claim 18, wherein the memory management circuit is further configured to group the logical blocks into at least a storage area and a buffer area, wherein the at least the part of the logical blocks belong to the storage area, and the second logical blocks belongs to the buffer area, when the program failure is not occurred, the memory management circuit associates the second logical blocks to the storage area and associates the first logical blocks to the buffer area.

20. The memory controller according to claim 19, wherein the memory management circuit is further configured to create a virtual-logical mapping table to record a mapping relationship between the virtual block addresses and the logical blocks of the storage area.

21. The memory controller according to claim 20, wherein the memory management circuit is further configured to provide the virtual block addresses to a plurality of application programs executed in the host system, and create the virtual-logical mapping table for each of the application programs.

22. The memory controller according to claim 18, wherein the memory management circuit is further configured to logically group the physical blocks to at least a data area and a spare area, where the logical blocks are mapped to the physical blocks of the data area, the first logical blocks is mapped to a plurality of first physical blocks of the physical blocks of the data area, and the second logical blocks are mapped to a plurality of second physical blocks of the physical blocks of the data area.

23. The memory controller according to claim 22, wherein during the memory management circuit writes the file data to the physical blocks mapped to the second logical blocks of the logical blocks, the memory management circuit is further configured to select a plurality of third physical blocks from the physical blocks of the spare area, write the file data into the third physical blocks, remap the second logical blocks to the third physical blocks, associate the second physical blocks to the spare area, and associate the third physical blocks to the data area.

24. The memory controller according to claim 23, wherein the memory management circuit is further configured to copy valid data, which belongs to the first logical blocks, from the first physical blocks to the third physical blocks.

25. The memory controller according to claim 18, wherein the memory management circuit is further configured to send an error message to the host system to respond to the write command when the program failure is occurred.

* * * * *